US009354782B2

(12) United States Patent  (10) Patent No.: US 9,354,782 B2
Gorod  (45) Date of Patent: May 31, 2016

(54) SOCIAL EXPOSURE MANAGEMENT SYSTEM AND METHOD

(71) Applicant: Alex Gorod, Brooklyn, NY (US)

(72) Inventor: Alex Gorod, Brooklyn, NY (US)

( * ) Notice: Subject to any disclaimer, the term of this patent is extended or adjusted under 35 U.S.C. 154(b) by 0 days.

(21) Appl. No.: 14/279,275

(22) Filed: May 15, 2014

(65) Prior Publication Data

US 2015/0332067 A1  Nov. 19, 2015

Related U.S. Application Data

(60) Provisional application No. 61/823,847, filed on May 15, 2013, provisional application No. 61/880,891, filed on Sep. 21, 2013.

(51) Int. Cl.
| | |
|---|---|
| G06F 17/30 | (2006.01) |
| G06F 3/0482 | (2013.01) |
| G06F 21/62 | (2013.01) |
| G06F 3/0484 | (2013.01) |
| G06F 3/0485 | (2013.01) |
| H04W 12/02 | (2009.01) |
| G06Q 50/10 | (2012.01) |
| H04L 12/28 | (2006.01) |

(Continued)

(52) U.S. Cl.
CPC ............ *G06F 3/0482* (2013.01); *G06F 3/0484* (2013.01); *G06F 3/0485* (2013.01); *G06F 3/04842* (2013.01); *G06F 17/30289* (2013.01); *G06F 17/30867* (2013.01); *G06F 21/6245* (2013.01); *G06F 21/6263* (2013.01); *G06Q 50/10* (2013.01); *H04L 63/102* (2013.01); *H04W 12/02* (2013.01); *G06F 21/604* (2013.01); *H04L 12/2829* (2013.01); *H04L 63/0421* (2013.01)

(58) Field of Classification Search
CPC .............. G06F 21/6263; G06F 3/0482; G06F 3/04842; G06F 3/0485; G06F 17/30289; G06F 21/6245; G06F 21/62; G06F 2221/2141; G06F 21/604; G06F 2221/2113; G06F 19/322; G06F 17/30029; G06F 17/30035; H04L 67/306; H04L 51/32; H04L 12/2829; H04L 63/102; G06Q 50/01; H04W 12/02
USPC ...................................................... 726/22–30
See application file for complete search history.

(56) References Cited

U.S. PATENT DOCUMENTS

| 8,166,406 B1 * | 4/2012 | Goldfeder et al. ............ 715/745 |
| 8,640,257 B1 * | 1/2014 | Sherrets et al. ................ 726/28 |
| 8,646,095 B2 * | 2/2014 | Mattox et al. .................. 726/27 |

(Continued)

OTHER PUBLICATIONS

Soumitra Dutta, What's Your Personal Social Media Strategy?, Harvard Business Review, Nov. 2010, USA.

(Continued)

*Primary Examiner* — Nirav B Patel
(74) *Attorney, Agent, or Firm* — Alexey Bakman, Esq

(57) ABSTRACT

The invention describes and claims a system and a method of computer-implemented social exposure management, intended for expeditious and near-simultaneous alteration of user's privacy characteristics across a plurality of social media environments. The system comprises a GUI interface for setting user's preferences, a processing component for transforming the user's preferences and commands into an action command sequence, an execution component for implementation of the user-selectable preferences and commands, and a feedback system for providing a report of the system's actions in altering of user's privacy characteristics.

16 Claims, 9 Drawing Sheets

(51) Int. Cl.
*G06F 21/60* (2013.01)
*H04L 29/06* (2006.01)

(56) References Cited

U.S. PATENT DOCUMENTS

| | | | |
|---|---|---|---|
| 8,713,055 B2* | 4/2014 | Callahan et al. | 707/785 |
| 2010/0110160 A1* | 5/2010 | Brandt et al. | 348/14.08 |
| 2012/0050310 A1* | 3/2012 | Patel et al. | 345/593 |
| 2013/0218902 A1* | 8/2013 | Vendrow et al. | 707/748 |
| 2014/0007255 A1* | 1/2014 | Altaf et al. | 726/27 |
| 2014/0059695 A1* | 2/2014 | Parecki et al. | 726/26 |
| 2014/0297749 A1* | 10/2014 | Jayaram et al. | 709/204 |

OTHER PUBLICATIONS

Robert Shullich, Risk Assessment of Social Media, SANS Institute Reading Room, Dec. 5, 2011, p. 2-4, 9-28.

Pekka Aula, Strategy and Leadership, Abstract, www.emeraldinsight.com/doi/abs/10.1108/10878571011088069, printed May 11, 2015.

Anonymous, Online Social Networking Dangers and Benefits, www.pacific.edu/Campus-Life/Safety-and-Conduct/Online-Social-Networking-Dangers-and-Benefits-.html Printed May 11, 2015.

* cited by examiner

SOCIAL EXPOSURE MANAGEMENT SYSTEM AND METHOD

This application claims priority to provisional application No. 61/823,847 for SOCIAL EXPOSURE MANAGEMENT SYSTEM, filed on May 15, 2013 and provisional application No. 61/880,891 for SOCIAL MEDIA HATS METHOD AND SYSTEM, filed on Sep. 21, 2013.

FIELD OF THE INVENTION

The field of the present invention is Social Media and particularly a system and method of managing social media exposure.

BACKGROUND OF THE INVENTION

More and more people are taking "Social Media Vacations." They are abandoning their social media accounts and other internet services. Some are taking weeks or months off. Others are deleting all posts and pictures and closing their accounts for good. The early years of social media's euphoric rise have passed and are now being followed by a grim mass exodus.

The extent of the exodus is now nearing the epidemic proportions and this is just the beginning Nearly everyone knows someone who is taking a break from the social media. Barely a day passes without an article in a major internet news or editorial site, describing someone's reasons for leaving the virtual embrace of the social media world. And those reasons are just as numerous as they are unique.

Some social media users simply just grew up. They are looking for jobs and social standing in the real, brick and mortar world. All of a sudden, the youthful thoughtless embrace with the virtual world is coming back to haunt them. The relationship wasn't as casual as they thought. It wasn't as anonymous, as safe or as consequence-free as they imagined. It left some nasty marks. Bad pictures on the walls. Some thoughtless words, dropped in a blog, that now, years later have come back with a vengeance. The doors of schools, of offices, of friends and future opportunities are closing before their noses.

For some realization came too late. For some, it came in time. Some social media users just grew wiser. And more and more are realizing that the honeymoon with social media is now over. Realizations of privacy, of safety, of real world concerns have started to creep in a while ago, and are now avalanching. We left too much, too deep a trace already. Whenever we are looking for a job, talk to a client, meet an important other, they Google us, they Facebook us, they Youtube us, and then they Google Plus on us some more before deciding to Link-in in real life.

Some social media users just grew tired. Tired of living their life through others. Tired to being tied to hundreds of fake friends. Friends they have never met, but friends who seem to anxiously await to hear of each move, of every plate of food they eat in every restaurant. Tired of the friends that they had no choice, but friend. Tired of living their life through others. Tired of envying the "friends," whose life are just too perfect for this world. Tired of being envied by others. Tired of the burden of living in two worlds at once, and missing on real life.

More and more people are attempting to bail out. Some temporarily, and some for good. But web 2.0 sites are holding onto users tight. A myriad of patents have been filed to lure the users in, and to expand and to hold on to user's virtual presence. And none that we know of, to help the individual escape, or lessen social media grip on individual.

Who hasn't wished sometimes that they could simply flick a switch, and in a moment dim out the lights in their virtual world. Delete stale posts, block access to the pictures, prevent the spouse from browsing the ancient posts on dating sites . . . . Sometimes we wish we could get out quick. Within a minute. Before that other person does the dreadful search. But there are so many sites we left our traces on. Who can remember all the sites and passwords? Who easily can navigate through maze of options? Which sites allow to delete and which will force to keep us all we ever posted. And there are virtually no tools to help. At least there were no tools to help until the system, set out below, was invented.

Accordingly, there is a long-felt and unmet need in the art for the system and method that could simplify, coordinate and accelerate user's withdrawal from social media and other internet services. Such system must be simple to use and provide pre-coordinated, but quick withdrawal of the user's presence across numerous and various internet services, thus protecting the user's privacy and social interests. The system and method of the present invention meet all of these requirements and provide numerous additional benefits.

SUMMARY OF THE PRESENT INVENTION

The present invention is defined by the following claims and nothing in this section should be taken as a limitation on those claims.

The present invention describes and claims a computer-implemented social exposure management system for expeditious and near-simultaneous alteration of user's privacy characteristics across a plurality of social media environments. The computer-implemented system comprises a user application with at least one GUI interface. The GUI interface is adapted to interact with the user to set up user's preferences. The system also comprises at least one internet connection for communication between the system and the plurality of social media environments. The system further comprises a database of social media environments, available for privacy alteration via the system and a database of available options for each social media environment. A processing component transforms the user-selected preferences and commands into an action command sequence. An execution component implements the user-selectable preferences and commands by transmitting the action command sequence to at least one social media environment. A feedback system provides a report of the system's actions in altering of user's privacy characteristics.

DETAILED DESCRIPTION OF THE PREFERRED EMBODIMENTS

Figure 1:
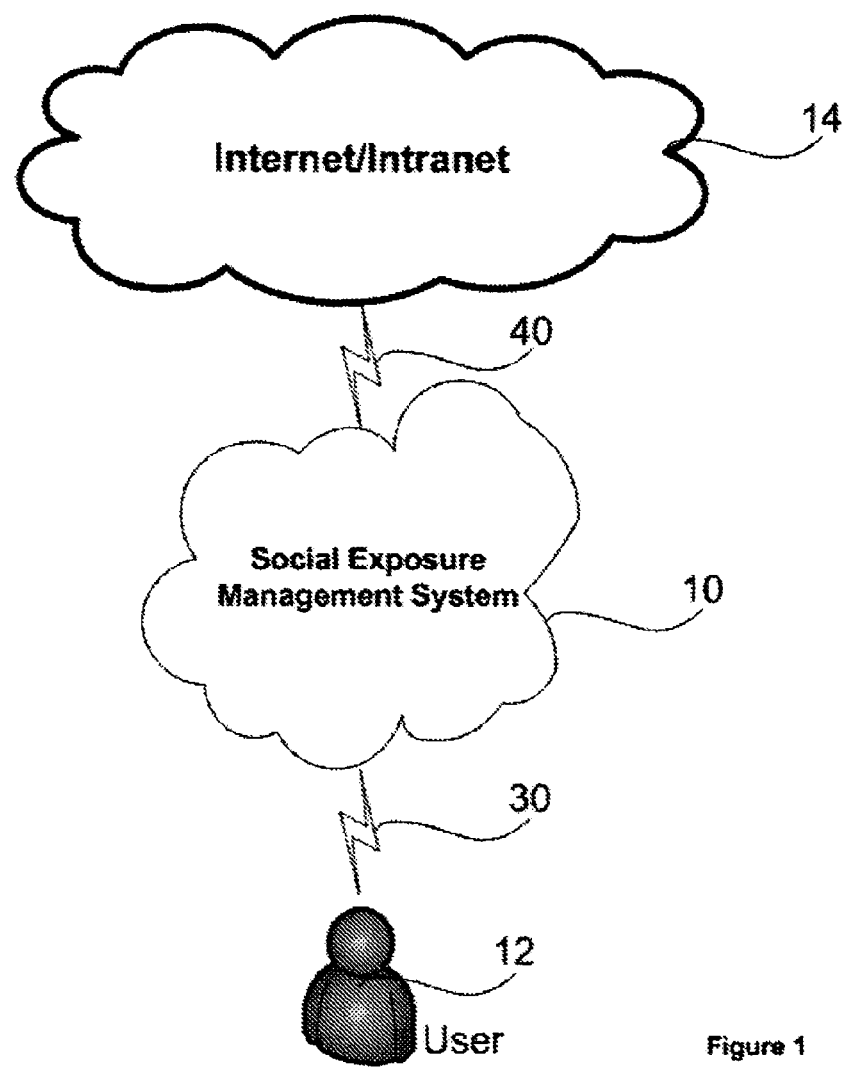
FIG. 1 is an overview of the Social Exposure Management System of the present invention in the context of its interaction with the user and internet/intranet resources.

The system and method of the present invention will now be illustrated by reference to the accompanying drawings. Preferred embodiments of the Social Exposure Management System and Method (also referred to as SEM 10, or SYSTEM 10 below) of the present invention have been assigned reference numeral 10. Other elements have been assigned the reference numerals referred to below.

FIG. 1 illustrates the general overview of user's 12 interaction with the social media and other internet/intranet resources 14 (aka Social Media Environments 14) through SYSTEM 10. SYSTEM 10 allows the user to implement settings and to apply changes to numerous internet/intranet resources 14 nearly instantaneously, with minimal effort. In the preferred embodiments, SYSTEM 10 allows the user to simultaneously minimize or extinguish their internet presence/exposure across multiple social media sites and other user-customizable internet services/social media environments 14, such as YouTube, Ebay, various dating and blogging sites, etc. In a sense, SYSTEM 10 allows the user to quickly disappear, (or almost disappear) off the virtual radars of online friends, fans, followers, potential employers, significant others, overly curious individuals, etc. The invention envisions numerous modes of minimizing online presence, in some embodiments allowing the user to define and preset the preferred mode and level of virtual presence withdrawal.

Figure 6:
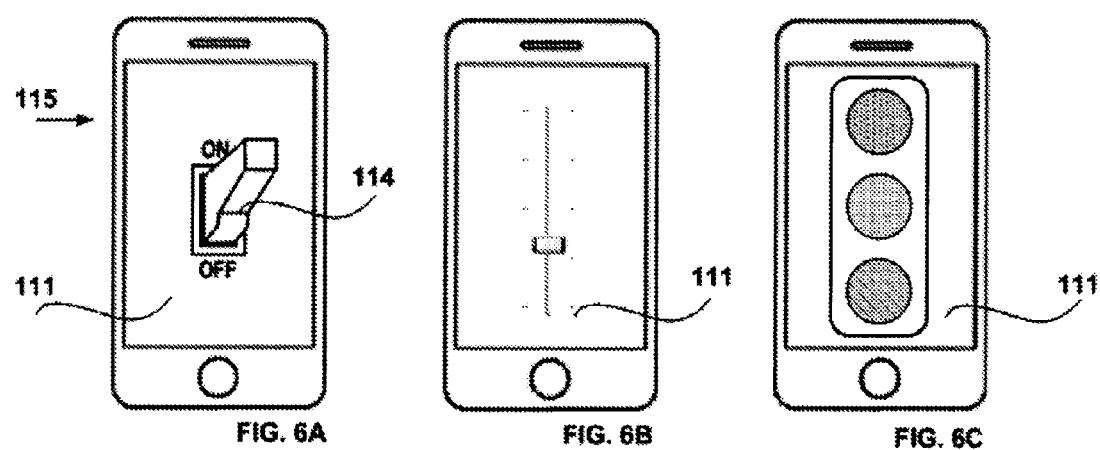
FIG. 6 A-D illustrates some examples of the GUI interface in some of the preferred embodiments of the present invention.
Figure 6:
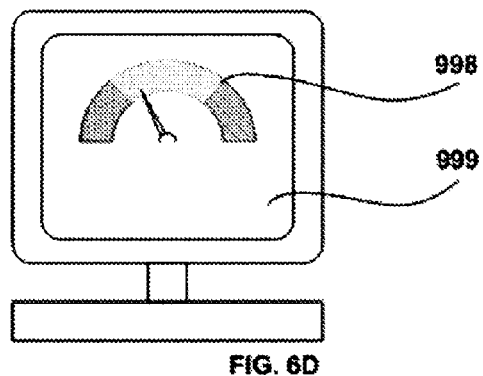

Once the SYSTEM 10 is set up, as shown on FIG. 1, the process of initiating the virtual presence withdrawal may be (in preferred embodiments) as simple as flicking a virtual light switch on a GUI interface, as illustrated on FIG. 6. The system is set up when the user is connected to the SYSTEM 10, and the SYSTEM 10 is in turn pre-set to connect and apply changes to the Internet/Intranet resources 14 upon user's 12 command.

In the preferred embodiments, the user 12 is a human, although the invention envisions other electronic systems incorporating SYSTEM 10 and/or acting directly as users 12 of SYSTEM 10. User 12 may utilize a number of systems and applications to access SYSTEM 10. In the preferred embodiments SYSTEM 10 is accessible by the user from a mobile platform, such as iOS, Android, Windows Phone, or a variety of other mobile operating systems, now known or later-developed. For example, the user 12 may download and install the GUI interface of SYSTEM 10 as an application into the iOS. The user 12 may then use his/her mobile device's internet connection to set up the preferences and/or activate the desired commands. Of course, in the preferred embodiments, the accessibility of the SYSTEM 10 is not limited to mobile devices and the SYSTEM 10 may also be accessed from home computers and other internet-capable devices. In such cases SYSTEM 10 may comprise more than one GUI interface. For example, a mobile device with a smaller touch screen may require a somewhat differently designed GUI interface than a desktop computer with a keyboard or a mouse. Thus one user may have access to more than one GUI screen to access SYSTEM 10, depending on the device and the operating system the user has access to at the moment of use.

The GUI interface is adapted for receiving input of user's preferences and commands from a user. User-selectable preferences refer to selectable options that are available for selection (check-off, for example) from a list a particular social media environment, or to preferences that require specific unique input from the user. An example of the latter would be the preferences associated with posting a privacy message across a plurality of social media environments. Such preferences would not be selected from a list, but rather entered by the user. For example, the user's preference could be to post a unique message "Do Not Disturb—STUDYING until 2/2/2015" across several social media platforms. Commands may refer to such action preferences as "Post", or "Save Selected Options for later use," for example.

The accessibility of SYSTEM 10 from mobile devices allows the user 12 to implement changes, such as limiting the user's 12 social exposure, as soon as the situation requires, using a communication device that is always in user's possession. An example of such situation may arise when the user 12 meets a potential employer, an important business contact, or any other person that may be important for the user 12. The user 12 may reasonably expect that as soon as the conversation is over, this new important acquaintance may research the user's 12 online presence to see his/her photos, videos, posts, and other information in order to gauge the user's 12 contacts, morality, social connections, political views, and other characteristics.

Understandably, if user 12 has posted potentially damaging photos, posts and other materials about themselves online, he/she may want to restrict access to such materials instantly. Presently, if the user 12 was faced with such a situation, he or she would have to first remember which social media and other online services they are subscribed to and which of these services contain potentially damaging data. Then they would have to login and access each of the services individually. Accessing each service will require logging onto each individual site, using a unique validation/authentication logon method for each service. It is foreseeable that the user will not instantly remember all of the screennames and passwords for every site and may have to request resets and reminders of the logon information. These manipulation will take time and effort, which the user 12 may not be in a position to spare.

Once accessed, the users would have to navigate through a long and complex maze of privacy settings, unique for each service. If the user 12 is active on several social media sites and other internet resources, the process of figuring out, deciding upon, and applying the changed privacy settings may take hours. That is, assuming that the user has knowledge and skills for accessing, understanding and changing the privacy settings. In the time the user 12 has sufficiently hidden/altered their internet presence, the interested party has long finished browsing and downloading the posts and photographs, and has already formed an opinion of the user 12. An opinion, perhaps, most damaging to the user's 12 future career, personal life, legal or social standing.

Having a pre-installed and pre-configured SYSTEM 10 app on the mobile device would allow the user 12 to simply flick a switch before they exit the interview room, or as he or she are still talking to the other person. Upon the flicking of the switch, SYSTEM 10 of the preferred embodiments will nearly instantaneously implement the preset privacy settings across a number of pre-selected social media and other internet services.

In the preferred embodiments, SYSTEM 10 is accessible from more than one platform (operating/system). Thus, in such an embodiment SYSTEM 10 may be accessible through the app, installed on the user's 12 mobile phone, as well as from the user's home computer, running Windows, for example. The accessibility of the SYSTEM 10 through a home computer may allow the user 10 the ease of setup on the large screen, if the user so prefers. At the same time, the accessibility from the mobile device allows for instant implementation of the privacy setting, as the situation warrants.

As stated above, the SYSTEM 10 comprises at least one, and preferably several GUI interfaces 20. The SYSTEM 10 may comprise different interfaces for each operating system. For example, in some variations of the present invention, the SYSTEM 10 may have a simplified interface for small-screened mobile devices and an interface with more options for home computers. Preferably, the main control page of the mobile-device GUI interface 20 is limited to one or more large, easy to operate switches, buttons or control levers (such as the switches/levers/buttons shown on FIG. 6A-D, for example), with functions primarily limited to controlling the user's 12 online presence/exposure. Although, it must be noted that the purpose and complexity of controls may vary in various embodiments of the present invention.

The system further comprises a user connection 30. The user connection 30 is the means of connecting with the user 12. This is preferably achieved through the internet connection that the user establishes with the System's 10 server. The connection may be established from the user's wireless device internet connection, wifi connection, or a wired internet connection, for example.

Figure 2:
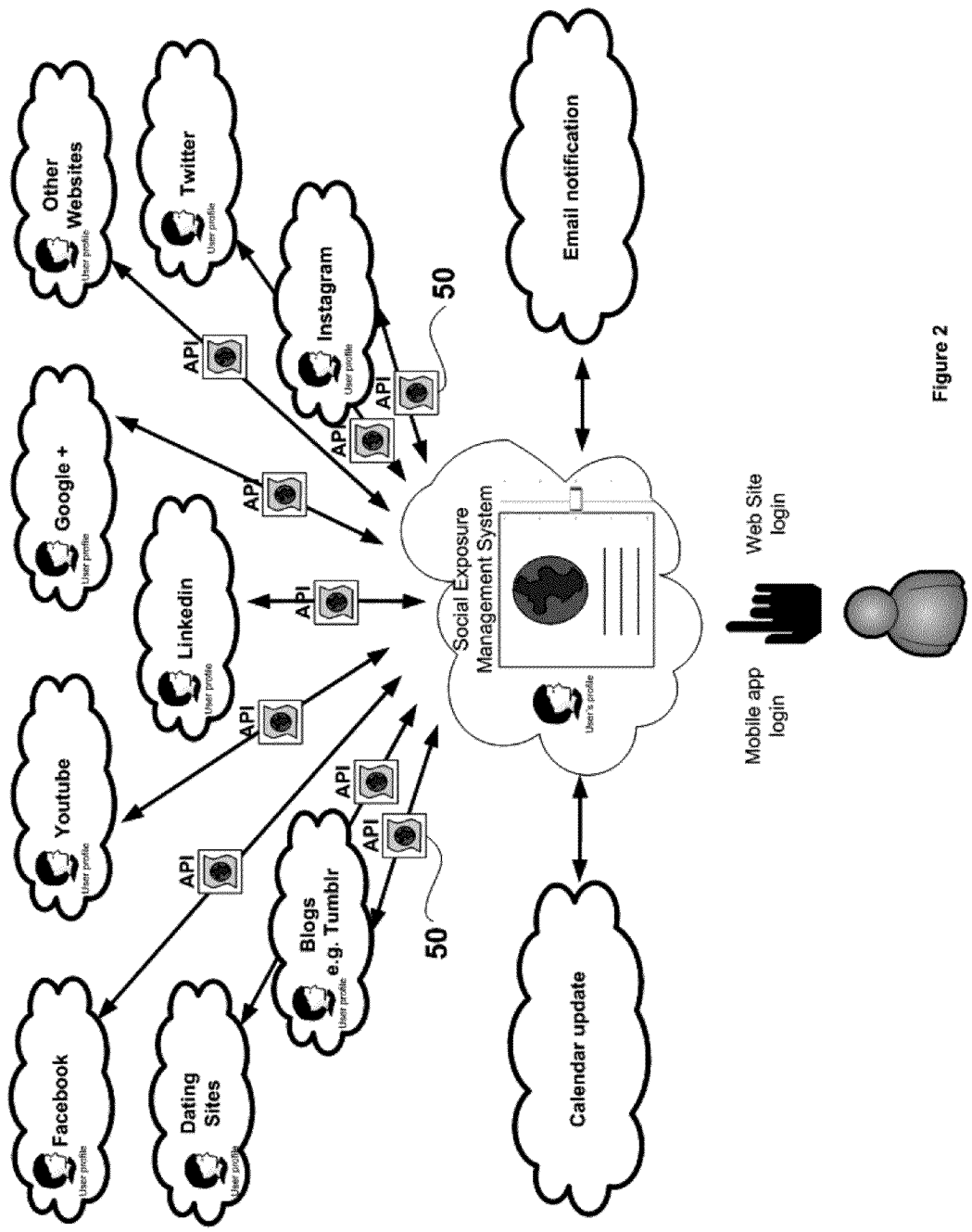
FIG. 2 depicts a more detailed view of the Social Exposure Management System of the present invention, illustrating some examples of the Internet/Intranet resources configurable by the user, as well as examples of additional functions, available in some embodiments, such as calendar update and e-mail notification.
Figure 3:
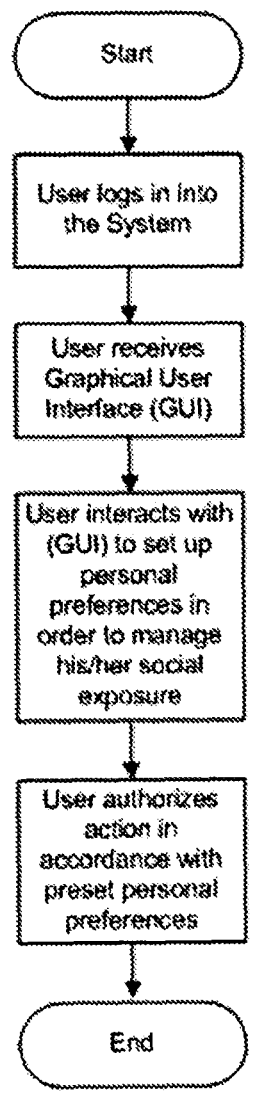
FIG. 3 illustrates user's interaction with the Social Exposure Management System of the present invention from the perspective of the user.

The SYSTEM 10 also comprises the at least one Internet/Intranet connection 40. This is the connection between the SYSTEM 10 and the Internet/Intranet 14 resources to be modified by the user 12. A part of the many examples of such Internet/Intranet 14 resources is illustrated in the top part of FIG. 2 and includes such resources as Facebook, Google+, Linkedin, various blogs, dating sites, Twitter, Instagram and a myriad of other resources where the user may have virtual presence. In some embodiments, such connection is achieved through and is limited by each resource's API 50. Although this invention anticipates that some Internet/Intranet 14 resources may allow the SYSTEM 10 direct access, not constrained by API limitations.

Figure 5:
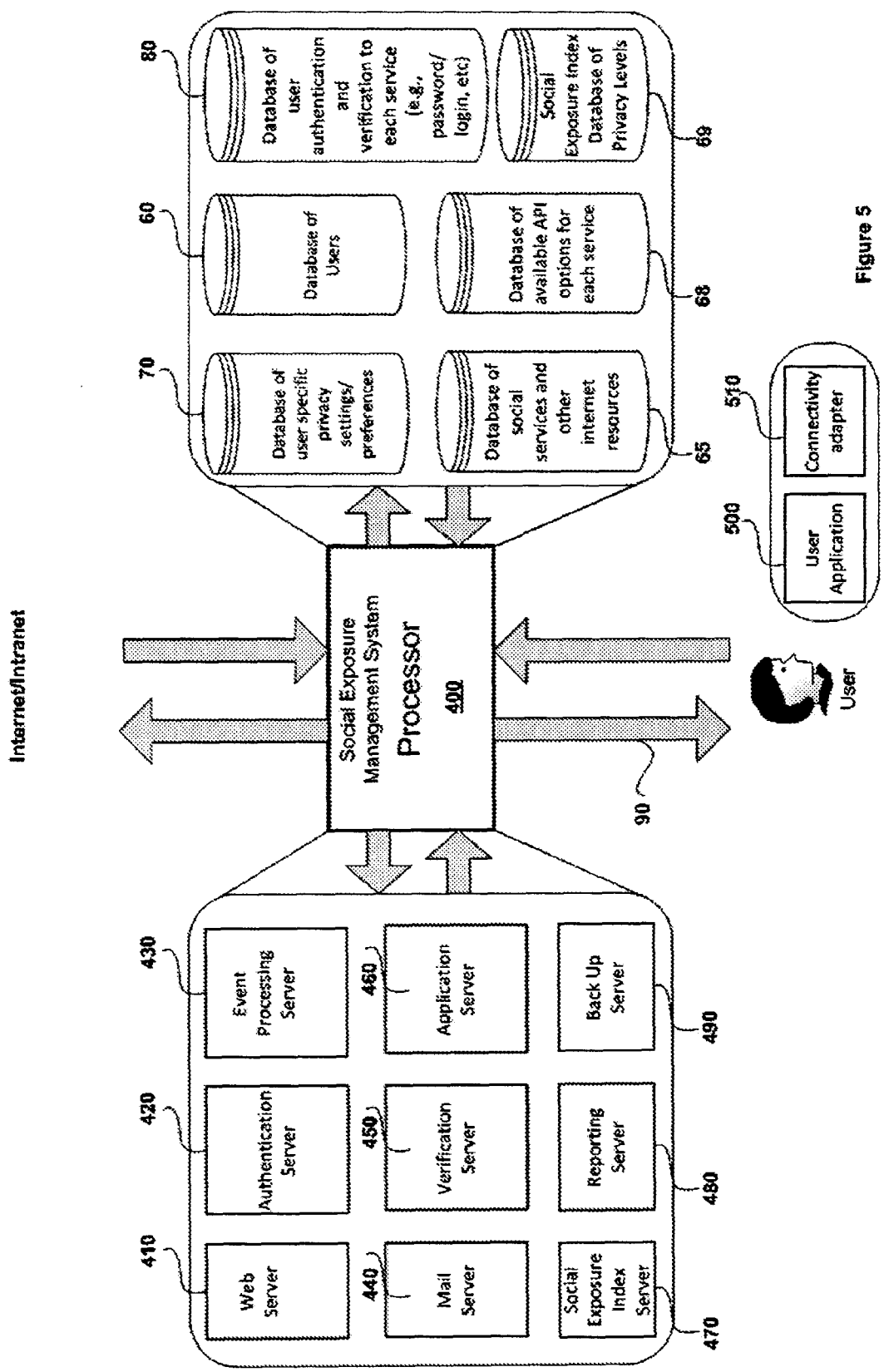
FIG. 5 illustrates a generalized interrelationship between parts of the System in one of the preferred embodiments of the present invention.

The SYSTEM 10 also comprises a number of databases and servers, as illustrated on FIG. 5. Some of such databases are positioned on a cloud and/or a server, remotely from the user 12. Yet, in some embodiments, certain databases may be stored directly on the user's device, such as the user's phone. One database of the SYSTEM 10 is the Database of Users 60. That is, the Database of users 12, who are registered for using the SYSTEM 10. This database preferably comprises SYSTEM 10 logon and verification information for each user 12.

Other SYSTEM 10 databases comprise the database of social services and other Internet/Intranet services/resources 65 that are available for privacy manipulations through SYSTEM 10. Preferably, another database comprises the list of privacy settings available for manipulation by the user 12 for each Internet/Intranet service available. Such database is referred to as Database of Available API Options for Each Service 68 on FIG. 5. Some services, may allow only limited privacy manipulations through API, such as allowing to restrict access to friends only, or the removal of certain photographs only. Yet other services, may allow the closing and erasure of the account through API. Such database of available actions for each service will be kept as part of SYSTEM 10 and presented to the user for selection.

A broad selection of manipulation options may be presented to the user 12 in some embodiments of the invention. In the preferred embodiments of the invention, the options will be primarily limited to those affecting the user's 12 privacy/exposure options.

Another database may be a Database of User-Specific Privacy Settings 70. The database will be filled from the selections made by the user 12 upon setup of the SYSTEM 10 or at a later time. The settings may contain such information as deleting an account from a certain service and removing certain photographs from another, for example. The settings will be kept dormant and will not be implemented until the user activates them from the GUI interface 115.

Another database, the Passwords Database 80 comprises access and verification information for access to the Internet services. Such database is referred to as the Database of User Authentication and Verification to Each Service 80 on FIG. 5. For example, such database may consist of screennames, passwords and permissions to one or more social media sites, dating sites, e-mail accounts, and other services. These screennames, passwords and permissions allow the SYSTEM 10 to access these services through API to implement user's 12 privacy settings.

In the preferred embodiments, two latter databases are stored on the System's 10 cloud/server. However, it is foreseeable that in some embodiments such information from one or both of these databases may be retained on user's 12 device (such as stored in a cell phone's or computer's memory) until the users command the implementation of their settings. At the moment of such command, the settings, passwords and permissions are transferred to SYSTEM 10 and instantly utilized to implement user's 12 settings through API.

The SYSTEM 10 further comprises a Feedback System 90. In the preferred embodiments of the invention, the system delivers a report of changes, after the user 12 initiates such changes. Feedback system of the preferred embodiments may deliver a report by opening up a separate screen, stating what the SYSTEM 10 was able to change and what it was not able to change. Alternatively, or in addition to the on-screen report on the user application 500, SYSTEM 10 may send such a report to user's 12 e-mail address, as a text message to the user's 12 mobile phone, via a voice telephone call or to inform the user by a variety of other methods well known in the art.

The SYSTEM 10 of the preferred embodiment further comprises a user application 500 and a connectivity adapter 510. The user application 500 refers to the application that the user 12 may utilize to interact with the SYSTEM 10. Preferably, the user application 500 comprises the GUI interface 115. Preferably, the user application 500 is an app, installable on user's device. Although, as stated above, in the preferred embodiments, SYSTEM 10 is accessible on the internet (Instead of, or preferably in addition to, the access via the special app) through any internet-capable device. The term connectivity adapter 510 refers to the mechanism of user's connection to the internet. The term is broadly-defined and in the preferred embodiments, it may refer to the user's phone's/tablet's wi-fi or 3G adapter, or a computer's Ethernet adapter, for example.

The SYSTEM 10 further comprises a processor 400. The processor 400 coordinates and processes the interaction between the user 12 and the Internet/Intranet 14, as well as the databases and servers. In the preferred embodiments it also transforming the user-selected preferences and commands into an action command sequence, such as a series of API commands, specific for each social media service.

The SYSTEM 10 comprises a number of servers, some of which are illustrated on the left side of FIG. 5 (across from the illustrations of some of the preferred databases). Some servers shown on FIG. 5 are Web Server 410, Authentication Server 420, Event Processing Server 430, Mail Server 440, Verification Server 450, Application Server 460, Social Exposure Index Server 470, Reporting Server 480, and the Backup Server 490. The purpose of these servers is as follows:

Web Server 410—in the preferred embodiment is a program that delivers Web content to the user.

Authentication Server 420—in the preferred embodiment is a program that determines whether the user should be granted access to the system.

Event Processing Server 430—in the preferred embodiment is a program that keeps track of events through processing and analyzing the data.

Mail Server 440—in the preferred embodiment is a program that will process mail related traffic including receiving and sending out emails.

Verification Server 450—in the preferred embodiment is a program that checks data consistency and creates validation reports.

Application Server 460—in the preferred embodiment is a program that is responsible for efficient execution of applications in supporting continuous full functionality of social exposure management system.

Social Exposure Index Server 470—in the preferred embodiment is dedicated to keep track and calculate the degree of social exposure for each user.

Reporting Server 480—in the preferred embodiment is a program that keeps track and provides reports about overall system as well as each individual user.

In some embodiments, the SYSTEM 10 may also comprise a Changes Log. Such log keeps track of privacy changes implemented by the user. Such a log may be used for reversing some or all of the changes made by the SYSTEM 10 upon user's command. It is generally expected that some of the changes made by the system, such as the removal of photographs, will be irreversible, unless the user 12 manually re-uploads the removed items at a later time.

Figure 4:
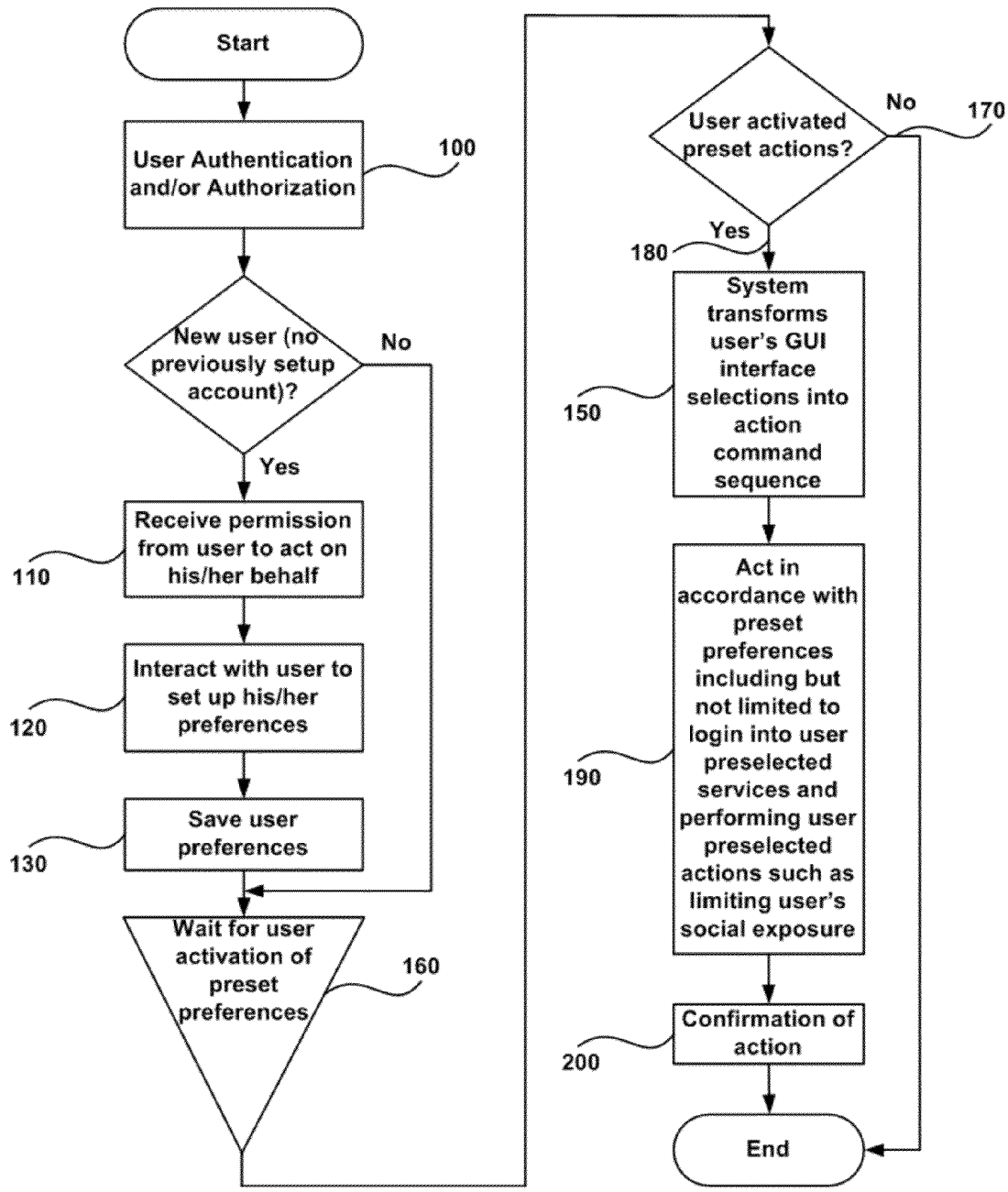
FIG. 4 illustrates the steps comprised by one of the embodiments of the System and Method of the present invention.

FIG. 4 illustrates the method/process of implementation of privacy settings, utilizing SYSTEM 10. FIG. 4 illustrates the step of user Authentication and/or Authorization 100 as the first step of managing social exposure with SYSTEM 10. If the user 12 is logging into the SYSTEM 10 for the first time, he will be asked to provide basic information and prompted to create a screenname and password or other verification credentials, as is well established in the industry of online services. The verification credentials, cookies and/or other identification information will then be logged into the Database of Users 60 and used for subsequent access to the SYSTEM 10 by the same user 12.

As a preferred option in some embodiments of the invention, upon first accessing the SYSTEM 10, the user 12 will be presented with a series of terms, conditions and warnings. These terms, conditions and warnings may explain, among other things, the potential irreversible nature of some of the changes that may be implemented through SYSTEM 10. The user will then have an option of agreeing to or rejecting the terms. As part of the agreement to the terms and conditions, the System will receive user's permission 110 to SYSTEM 10 to use his/her credentials and/or to act on his/her behalf in implementing the changes on remote services. In various embodiments of the invention, the user 12 may have an option to agree to these conditions and grant these permissions when he/she first starts using the system and/or at the time of set up and/or at the time of implementation of settings.

In the preferred embodiment, the SYSTEM 10 interacts with the user 12 (preferably through GUI interface 115) to set up the preferences 120, also referred to as privacy preferences 120 and privacy characteristics 120. The term "interacts" refers to presenting the user with selectable options or allowing the user to enter information by selecting the options and/or entering external information (such as statements or photographs to be posted across one or more social media platforms). The term privacy characteristics 120, as used here, is a broad term, referring to a number of settings and actions that may affect user's privacy. It refers to the settings that obviously affect privacy, such as the privacy and visibility settings of a social media service, as well as more subtle choices related to the user's social media presence, such as removing a picture, substituting a picture, editing out certain words from posts, or posting a notification, such as a personalized "Do Not Disturb" sign. Although there are various possible ways of setting up the user preferences 120, in the preferred embodiment, the initial setup is achieved by taking the user through a series of successive screens that list various selectable options.

Figure 7:
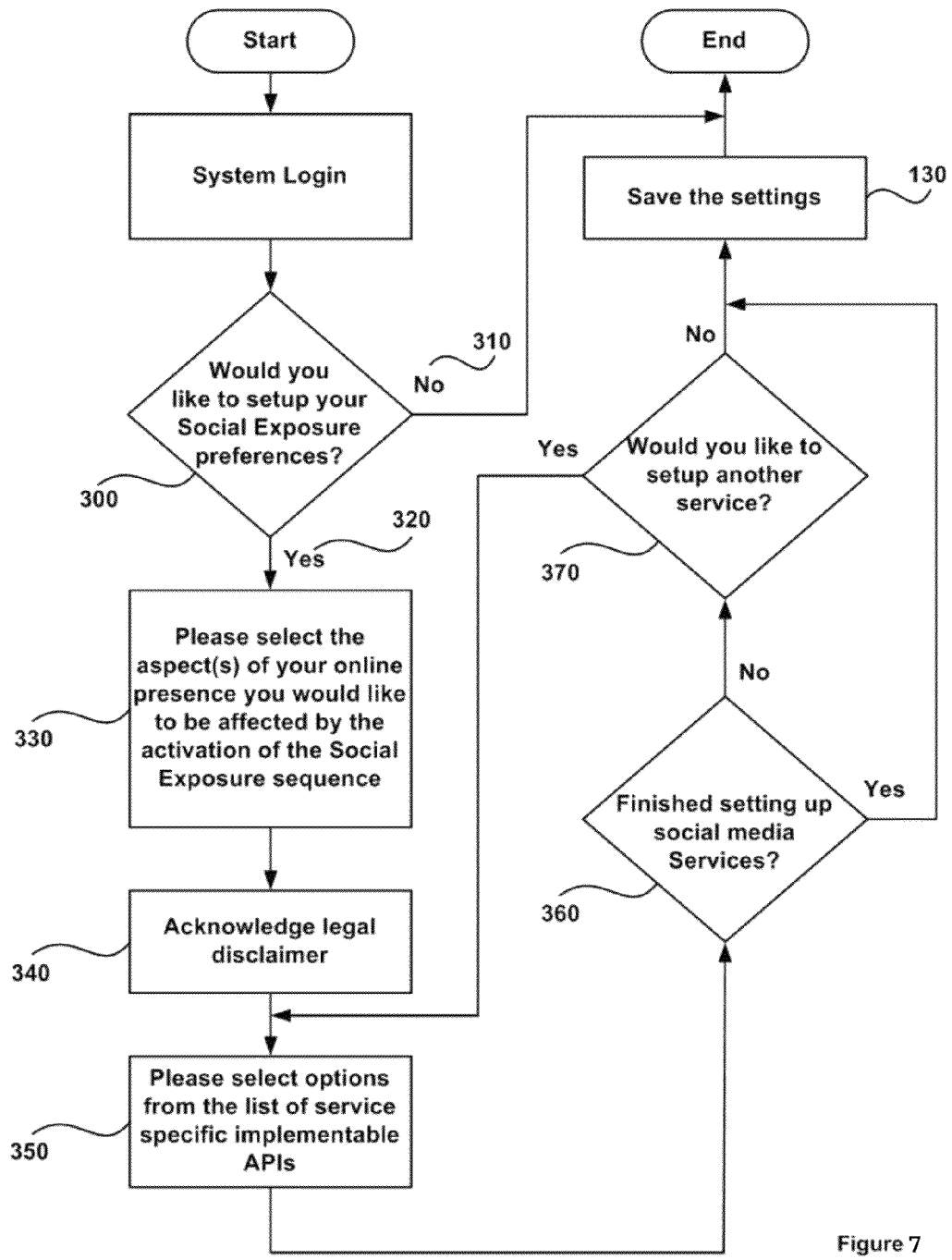
FIG. 7 illustrates the steps of user's interaction with the system in setting up the preferences in one of the embodiments of the present invention.

One of the preferred embodiments of the system setup is illustrated on FIG. 7. In that variant, the user is presented with an option to set up the preferences 300 on the very first time that the user activates the system's app or accesses the System's 10 web page. The settings page also remains accessible for later changes or adjustments of the settings at any time the user desires to make such changes.

As soon as the user logs into the system of the preferred embodiment, he may be asked by the pop-up dialog box: "Do you want to set up your time-out preferences? YES—NO" 300. It is preferable that upon the first access by the user, the system is turned off or minimized in functionality to avoid accidental implementations. That is, the system is configured not to apply any changes (or apply only reversible changes), even if the user flicks the Time-Out switch. One example of such reversible change may be switching user's Facebook account privacy settings to be visible only to his close friends. If the user's 12 selection is "NO" 310 in response to the request to set up the preferences, the system remains in this passive/minimalist status.

If the user selects "YES," 320 the system presents user with the next screen. On this screen 330, the user may be asked what aspects of his/her online presence the user wants to be affected by the activation of the Time-Out sequence. For example, the screen may present a number of icons or labeled buttons, with each button representing a type of medium/services. In one of the embodiments, one button may indicate settings for "Social Media", the other for "Photo and Video Sharing Services", yet another for "Dating Sites", and yet another for "Shopping/Selling" websites.

These categories are just illustrative of the great number of categories that may be pre-set for "tuning down" by the system of the present invention. Once the user clicks one of the choices, he is presented with the next choice screen. For example, if the user clicks on the "Social Media" selection, then he/she is given the subsequent functions related to that aspect of the user's online presence. In the case of the preferred embodiment, the user is transferred to the new selection window, listing the choices of social media websites that the user is able to adjust through the system. For example, the window may list the icons of such social media services as Facebook, Google+, Weibo and VKontakte, among others.

The user then selects the services that he or she is subscribed to one by one and selects individual preferences for each service. For example, the user may initially click on the Facebook selection. He/she is then asked to confirm his or her subscription by entering the screenname and password. The user may be (optionally) presented with a set of legal documents, warnings and disclaimers wherein the user is informed of the potential dangers of using the system and grants the system permission to access a given service on his/her behalf 340. The forms are preferably service-specific. That is, the forms presented when the user clicks on "Facebook" are different than the ones that are presented when the user clicks on "Google+". In addition to being service-specific, the forms may also be user or location-specific.

The user may then be presented with a list of options implementable by the system through API for each particular service 350. Preferably, the choices made by the user in this step will be implemented when and if the user ever activates the main controls of the system. The options are preferably presented in the form of yes or no, or multiple choice questions. Alternatively, there may be a switch to turn each option to the on or off status.

For a social media site, such as Facebook or Google+ the choices may include (but are not limited to) the questions such as: "Do you want to delete all of your wall posts?" if the user selects yes, they may be provided with additional questions such as: "From what day do you want your wall posts deleted?" and present a popup calendar. Another question may be: "Do you want to limit the visibility of your profile?". If the user selects yes, he/she may be presented with the follow-up questions: "Do you want to be visible for Facebook subscribers only?", "Do You want to be visible to your close friends only?", etc. The system may further ask "Do you want to hide all of your pictures?". "Do you want to remove all associations with you on other people's pictures?", "Do you want to delete your "Job status" section?", "Do you want to delete your relationship status section?", "Do you want for the Time-Out system to post a message on your wall?" The latter question may be followed up with the system allowing the user to type in a message or choose a pre-existing message that will be posted by the system on the user's wall in the event that he/she activates the system. For example the message may say: "Friends, I am taking a vacation from social media. I will not respond to messages or post status updates until further notice." Alternatively the message may say: "I will be unable to access Internet for the next two weeks. If it is an emergency, contact my secretary," or even "If you see this message, I'm in trouble. Call the police", or a myriad of other messages.

In one of the preferred embodiments, described below the user is allowed to post a virtual "DO NOT DISTURB" sign, that looks similar to the door knob labels posted in the hotels. Such label is customizable with user's reason for absence, the time the user may be back, and even a photograph (potentially illustrating the reason for absence).

In some embodiments, the user may have an option whether the changes affect the entire account or will only pertain to certain groups. For example, the user may have an option of hiding the pictures from everyone, but the closest family members. Alternatively, the user may send a message only to his co-workers group/circle.

For certain services, the amount of options can be quite extensive. The kinds of changes that may be implemented will depend on the type of service and the permissions that a particular service's API currently allows. As API permissions of the service, such as Facebook change, or as special permissions are granted to the system by the service, the list of available options will be expanded or contracted.

Once the user has finished setting up a particular social media service, the user may be asked whether he/she is finished 360, or alternatively (in the preferred embodiment), to click a return icon, in order to save the settings go back to selecting the next social media (or another type of service) to set up 370. Thus, after setting up Facebook preferences, the user may click a back icon and again be presented with the list of other social services. The same user may then select "Google+" and repeat the setup. Once settings for all the social media services are complete, the user may click on the back icon again and go back to selecting another group of services, such as "Shopping/Selling." There the user may elect to set-up Ebay, Amazon Marketplace, or a myriad of other services. Upon selecting Ebay, for example, the user may select an option of "End all my auction listings immediately" or "Send a letter to all current bidders," or a myriad of other options. Certain options, when selected, may trigger pop-up warnings, such as the warning stating that the changes selected are irreversible.

Once the user goes through all the services and all the settings he/she wants to implement, they select the "save" or "back" button, and are then taken back to the main control page. The system then saves user preferences 130. As described above, the preferences are preferably saved on the cloud and/or main server of SYSTEM 10, but may, in some embodiments, be saved in the memory of the user's device.

It is also foreseeable that in certain embodiments of the invention, the user will be able to choose from generic settings, applicable to several services. That is, instead of choosing the settings for each particular service, the user 12 would be able to choose from generic set of settings which will apply to several social media and/or other services. For example, in some embodiments, the user 12 may be able to select a broad setting which may command the SYSTEM 10, such as, to implement the strictest privacy settings, or to remove all pictures, or all status posts, or to defriend all friends, etc., from all services, where it is possible to do so.

The unified, generic settings may depend on the numbers and types of services selected by the user 12. Or, the user 12 (or the SYSTEM 10), may potentially unify services into groups, so that it may be easier to apply generic settings to a group of services. For example, Vimeo, YouTube, Vevo, Dailymotion, Veoh, Metacafe, Ustream, Fora, Rutube, Teachertube, Tu.tv, YouNow, and a myriad of other video-sharing sites, may be grouped together in the Video Sharing Group. Such grouping may make it easier for the user 12 to implement video-specific settings, such as locking all viewers' ability to comment on videos, for example. Such a setting may become useful if videos become controversial and the user wants to avoid arguments and offensive statements from becoming associated with their videos. For example, the user 12 may be an environmental safety, or public relations officer at a major oil company and is posting promotional videos about the positive environmental impact of his company's business. If the company's oil rig suddenly explodes, causing catastrophic pollution, it may be in the user's best interest to instantly turn off the ability to comment across all services where his/her videos are posted. This will prevent numerous third parties from instantly posting rash and premature theories, accusations and unconfirmed facts that may mislead the public and potentially hamper rescue efforts.

The generic settings for such sites, depending on sites' API permissions and options, may include the options to remove sound or subtitles from all videos on all sites, delete all comments, change titles, remove all videos, videos with certain keywords, etc.

In certain embodiments, such generic settings may be available instead of, or in addition to the more detailed, service-specific settings. For example, in some variants of the SYSTEM 10, the generic settings may be available in the rough, basic pre-set interface, while the service-specific settings may be available in the fine-tuning interface. The availability of fine-tuning settings and/or the ability to group services may also be one of the features used to distinguish paid and free versions of the apps of the present invention.

Once the user's GUI selections are entered, saved and/or uploaded into the SYSTEM 10, the SYSTEM 10 translates user's selected preferences 150. That is, the system transforms user's GUI interface selections into action command sequences 150. The preferences are translated by transforming the GUI selection by the user into a programming language sequence that orders the system to contact each of the outside internet/intranet 14 resources selected by the users and to interact with the resource to implement the changes selected by the user. For example, the user may only click on the facebook icon and flick the "Remove My Profile Photo" switch to the "ON" position. The SYSTEM 10, in turn, transforms this GUI selection into a series of preset commands (such commands preferably stored in a database), which may comprise the commands to contact each service directly or through each service's API, and to send service-specific commands to each service in order to implement user's selection. Since many API commands are unique, the translation and/or implementation approach for each of user's selection may be different or unique for each type of internet service as well for each individual service. The translation/transformation of GUI selections into action commands 150 preferably takes place immediately upon the saving of preferences by the user 130. It is foreseeable that in some embodiments, especially where the selections are stored on the user's device, the transformation into commands and actions may take place only upon activation/implementation of selections by the user.

The transformation is carried out by the processing component 400 adapted for transforming the user-selected preferences and commands into an action command sequence.

In the preferred embodiments, the processing component 400 is the processor 400, positioned remotely from the user 12. However, in some embodiments, especially where the selections are stored on the user's device, the processing component comprises the processor of the user's device (such as the processor of the user's telephone) for transformation of selections into API commands and actions specific for each Social Media Service.

Once the preferences are saved 130, the system waits 160 for the user activation of preset preferences. Although the preferences may be made and the SYSTEM 10 may be preset by the user, the moment of activation may never come 170. In such a case, the SYSTEM 10 may never access any outside internet/intranet 14 services and never implement any changes on user's behalf. When and if the user 12 decides to implement the changes 180, he may do so from the main control page 111.

In one of the preferred embodiments, the main control page 111 constitutes a simple on-off control 114, such as a simple virtual button in the form of the on-off toggle switch/lever (such as shown on FIG. 6A). Alternatively, the on/off control can be a red button. When this switch/button is activated, all of the functions, previously preset and agreed to by the user, are implemented by the System 10 automatically on all the services selected by the user 190. This implementation of user selection by the System 10 is also referred to as the execution component 190.

In some embodiments, additional safeguards may be implemented to prevent accidental flicking of the switch. For example, the preferred embodiment comprises a layer of virtual glass that has to be tapped and virtually "broken" before the switch can be activated to the ON position. In other embodiments, additional warnings may pop-up and require confirmation before the changes are implemented. For example, in one of the embodiments, the pop-up may say "Some of the changes about to be implemented are irreversible. Are you sure you want to proceed?" The user may at that stage have another chance to confirm or abort the implementation.

In some embodiments of the invention, the main control page may comprise a "restore" button which, to the extent possible, restores the previously-implemented changes to the online service settings previously affected by the system. In such an embodiment, the SYSTEM 10 comprises a backup database that tracks and possible saves sufficient information to attempt the restoration of user-implemented changes at a later time.

Yet in other preferred embodiment, the system may comprise an extra step of setting several time-out levels, depending on the situation. For example, in some situations, the user may just want to inform his friends/buyers/viewers across different services of his unavailability for a certain time. Such a setting may be limited to sending out letters or making posts across different services about the user's unavailability, inability to respond, delay in shipping of goods, etc. In some embodiments, such level may be referred as level 1 time out and may be indicated with green color. (It should be noted that in other embodiments green color may be used to indicate status quo, or alternatively, reversible changes or options associated with return from the social media blackout, the relaxation of restrictions).

On the deeper, second privacy level, indicated with yellow color, the user may want to slightly limit the exposure across the services, such as making his/her profiles visible to subscribers of these services only, or to his/her friends only. The user may want to implement some privacy settings, but may want such settings to be reversible.

Another, third, red level, for example, may provide the deepest possible privacy level. Such setting may include such presets as irreversibly deleting all possible images and posts, changing all possible screen names, and closing as many accounts as possible, among other options.

In such an embodiment, the main control may comprise three settings for the switch/wheel controller or three colored buttons: green, yellow and red, representing three levels of privacy settings. One example of a GUI interface associated with such an embodiment is shown in FIG. 6C. The Figure illustrates three buttons: green, yellow and red, where each one of the buttons is associated with a different privacy setting. Alternatively, the main control may comprise an adjustable slider, as shown in FIG. 6B. In such an embodiment, each position of the slider may be associated with a pre-determined privacy setting. The adjustment of the slider by the user 12 modifies user's online privacy level. Yet in other embodiments, the privacy levels may be indicated by a gauge 998, as shown in FIG. 6D. The gauge can be used to both, select the privacy setting by the user 12 (such as by dragging the needle) or to indicate to the user 12 the existent privacy level. In that particular embodiment, the gauge 998 is shown on the monitor of the desktop computer 999, emphasizing the fact that the present invention is not limited exclusively to the use on mobile devices. The number of "Time Out" or "Privacy" levels and options may vary among the embodiments.

In the embodiments with several levels of settings, the user is presented with an additional selection prior to the step of selecting the types of services. The user may be asked: "Which level of Time-Out settings do you want to set up?" The user selects the level from choices on the screen, and then proceeds with selecting the types of services and setting up each individual service, as described above. After all the selections are made in one level (such as green), the user returns to the selection of privacy levels and may select a different level to repeat the selection of options and to implement the settings differently for the next selection (such as yellow).

In some embodiments, the selections for the levels may be initially preset and adjustable by the user. In the preferred embodiment, all changes are initially set to off, with user activating each particular setting individually.

Some embodiments of the SYSTEM 10 comprise a Social Exposure Index Database of Privacy Levels 69. The term Social Exposure Index (SEI) 700 is a concept of evaluation of the user's privacy and/or social risk level on the Internet. SEI 700 is used to describe and measure the degree, the intensity and/or the range of user's social exposure across the virtual world. In some embodiments, the concept may be thought of as being similar to a score from a credit bureau, except evaluating the user's internet exposure rather than a financial standing.

A great number of variables may be considered by a credit reporting bureau in computing one's credit score, including one's earnings, assets, loans, the consistency of prior payments, open opportunities to borrow money, etc. Similarly, SEI may be calculated from the variables of the user's past and present internet presence and activity.

In other words, SEI allows for a method of social exposure evaluation and management. A first step in establishing SEI is in identifying general risk factors 705 of social media exposure. A few of the many general risk factors 705 that may be evaluated in determining the user's SEI may include posts across the internet by the user, posts by others about the user, the user's own webpage, participation in the social media sites, the types of social media sites, the frequency and the content of the posts, the number of times controversial keywords are used, the number and the social status (or SEI) of the user's connections and friends, traceability between the virtual and real-life persona, etc.

In preferred embodiments, SEI 700 is represented by a number (referred to as Social Exposure Index value 710). This number, in some of the embodiments, may be stated as a normalized value between 0 and 1, with 0 representing no exposure on the internet at all, and 1 representing maximum, complete exposure. The values between zero and one represent varying degrees of exposure. To establish a user-specific numeric Social Exposure Index value 715, a numerical weight value 720 is assigned to each general risk factor of social media exposure.

Much like with credit score reporting, in evaluating SEI, too little or too much of something is not necessarily a positive or a negative factor in determining the numerical weight value 720. For example, zero presence on the internet, and the total absence of Linkedin and other social media accounts, or the absence of connections in such accounts is not necessarily a positive thing. It may indicate asocial personality, the absence of any business connections and/or inability to use the internet or to pay for the internet connection. Too much internet activity, with too many friends and too many explicit or controversial posts may indicate another extreme and suggest a potential for legal liabilities, blackmail vulnerabilities and trade secret leaks.

All of such the general risk factors of social media exposure are compiled in a Social Exposure Index Database 725. The risks in this Database 725 may be used for searching out and identifying 730 the presence of individual risk factors of social media exposure for a particular user by comparing user's social media exposure against the general risk factors of social media exposure in Social Exposure Index Database 725. For example, the system may identify a risk, such as "the use of curse words in social media posts" and then search user's posts for the potential presence of such curse words. Whether such curse words are found, which curse words, in what context and quantity will play a role in calculating a user-specific numeric Social Exposure Index value 715. In the preferred embodiments all risks in the database 725 will be checked against user's online activity and evaluated, with a numerical weight assigned to the risks found. Once a user-specific numeric Social Exposure Index value 725 is calculated 733, it may be reported to the user 735 by publication on the GUI interface, for example. As described below, the Social Exposure Index value 725 is a useful tool in some embodiments of the SYSTEM 10, providing an objective measure of the user's social measure exposure and allowing for objective decisions on how to improve the risks associated with such exposure.

In some instances, the user may want (or be required by his/her employer) keep the Social Exposure Index value 725 above a below a certain number. Such a value that the user desires (or needs) to attain may be obtained 740 from the particular user by SYSTEM 10 through the GUI interface. System 10 may then evaluate 745 the changes required to user's social media exposure to attain Social Index Value desired by the particular user. For example, SYSTEM 10 may suggest the removal of certain obscene photographs or certain statements, containing potentially offensive terms to establish a certain value. The value may then be achieved by editing 750 the particular user's social media exposure (i.e. modifying, adding and deleting certain posts, pictures, videos, etc.) to attain Social Index Value desired by the particular user. Such editing, in the preferred embodiments of the present invention, is carried out by the SYSTEM 10, although in some embodiments it may be carried out by the user directly.

SEI may be reported as a pure exposure number, indicating just how much or how little internet exposure the user has, without evaluating the effect of such exposure. Alternatively, in some embodiments, the number can be reported as a biased SEI score and may be derived in light of intended use. For example, the biased SEI score may be reported in light of the user's occupation. If the user seeks a biased SEI in light of his position as a secret agent, too many friends, photos, and too many posts about the true identity will be a detriment and will bring the overall score down. If the user makes a living as a scandalous rock star, too much exposure and too many controversial posts and links may be an asset and may raise the overall exposure score in the professional context.

The concept/invention of SEI has a number of various utilitarian applications. In association with the SYSTEM 10, SEI may be used to determine a particular level of exposure to be implemented by SYSTEM 10 or to measure the level of exposure after the changes are implemented. In such embodiments, the use of SEI in the form of a pure unbiased exposure value is preferred, although the use of biased SEI is possible. In some embodiments, the SYSTEM 10 may comprise a SEI-meter, indicating the value of user's exposure. SEI value may be determined by the Social Exposure Index Server 470 from the data comprised in the Social Exposure Index Database of Privacy Levels 69. In these variants of the invention, the user will be able to pre-set the adjustments needed to achieve certain SEI value or values. It is foreseeable that in some variants the SYSTEM 10 will be pre-calculating the changes to the user's SEI value as the user selects presets. For example, the SYSTEM 10 may suggest that the SEI value will decrease by 0.2 if the user 12 elects to delete all Facebook pictures.

The user may then be able adjust the level of his/her social exposure by moving a slider (of the type shown in FIG. 6B) or a gauge needle (of the type shown in FIG. 6D) or any other control on a GUI interface. The implemented settings will may then lower the SEI of the user. In some embodiments, a number, indicating a projected SEI value may be displayed on the GUI interface (predicting the change to SEI) as the user adjusts the controls, and/or SEI value may be reported back to the user via the feedback system 90 once the changes are implemented.

Once the user activates the preset settings 180, the SYSTEM 10 acts in accordance with preset preferences 190. That is, the SYSTEM 10 applies user's GUI selections, translated into commands, to carry out the actions, desired by the user. The actions of the SYSTEM 10 may comprise, but are not limited to logging in into user pre-selected services and performing user pre-selected actions, such as adjusting certain settable parameters, limiting user's social exposure 190.

For example, in the preferred embodiments, the SYSTEM 10 will attempt to login into each service pre-selected by the user. Once logged in, SYSTEM 10 will use direct communication or API protocol to remove, posts, photographs, auctions, profiles, set visibility and other privacy preferences etc., on each service, as pre-selected by the user. It should be noted that the scope of privacy changes implementable by the SYSTEM 10 is not limited to removal and deletion of information. In some embodiments the SYSTEM 10 may post additional information. For example the SYSTEM 10, once implemented, may log into the user's e-mail and/or social media accounts and send e-mails or text messages (or other types of messages) to all contacts. Such letter/message may inform the contacts that the user 12 is unavailable until a certain date and request not to send messages or make any posts. The SYSTEM 10 may access and make appropriate changes in user's 12 online calendars.

One particular preferred embodiment of the present invention is specifically concerned with posting (rather than deleting), privacy-enhancing information. Such an embodiment is known as the DO NOT DISTURB APP (or DND APP).

In this embodiment, the preferences 120 comprise an option to create a personalized graphic privacy statement 600 and to post it near-simultaneously across user's social media sites. In fact, this may be the only option of this particular preferred embodiment. An example of one such personalized graphic privacy statement 600 is illustrated in FIG. 8.

Figure 8:
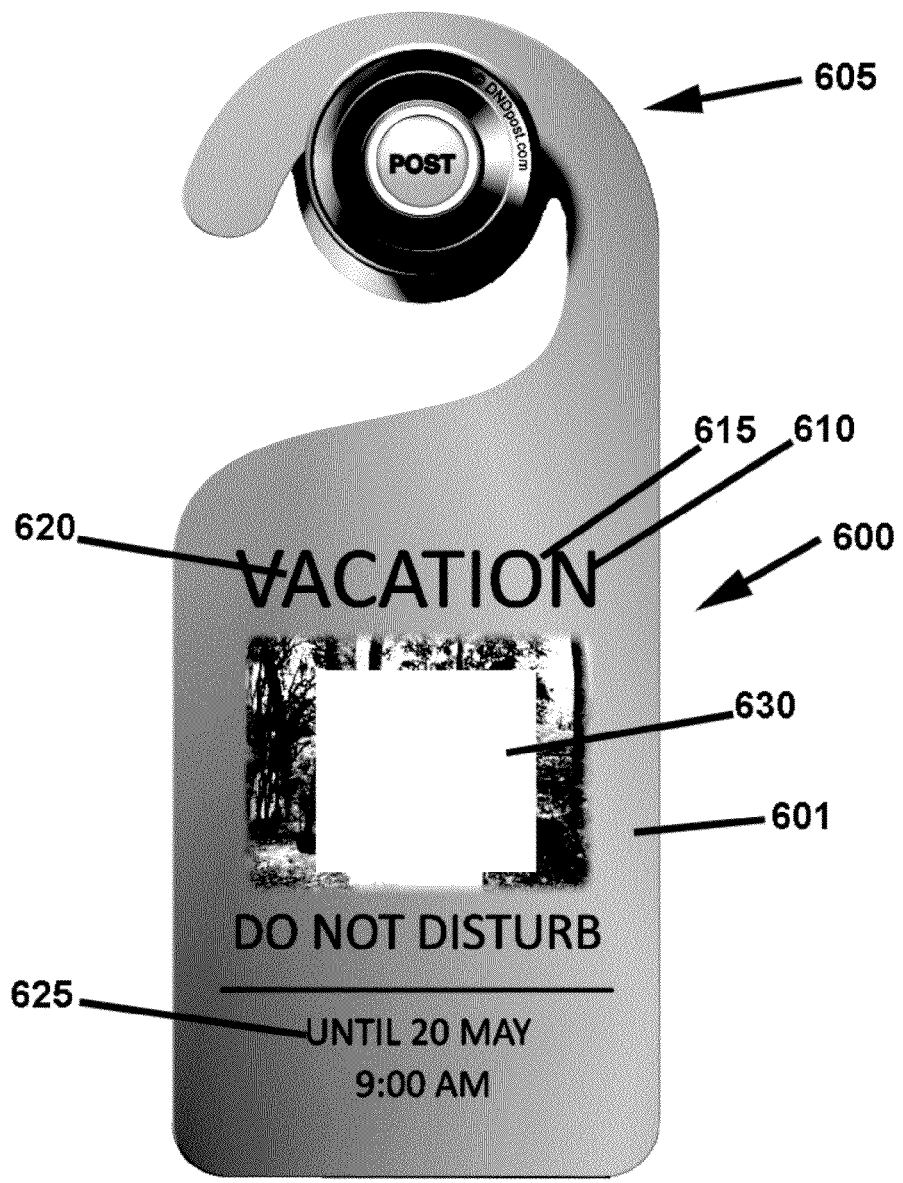
FIG. 8 illustrates an embodiment comprising a personalized graphic privacy statement.
Figure 9:
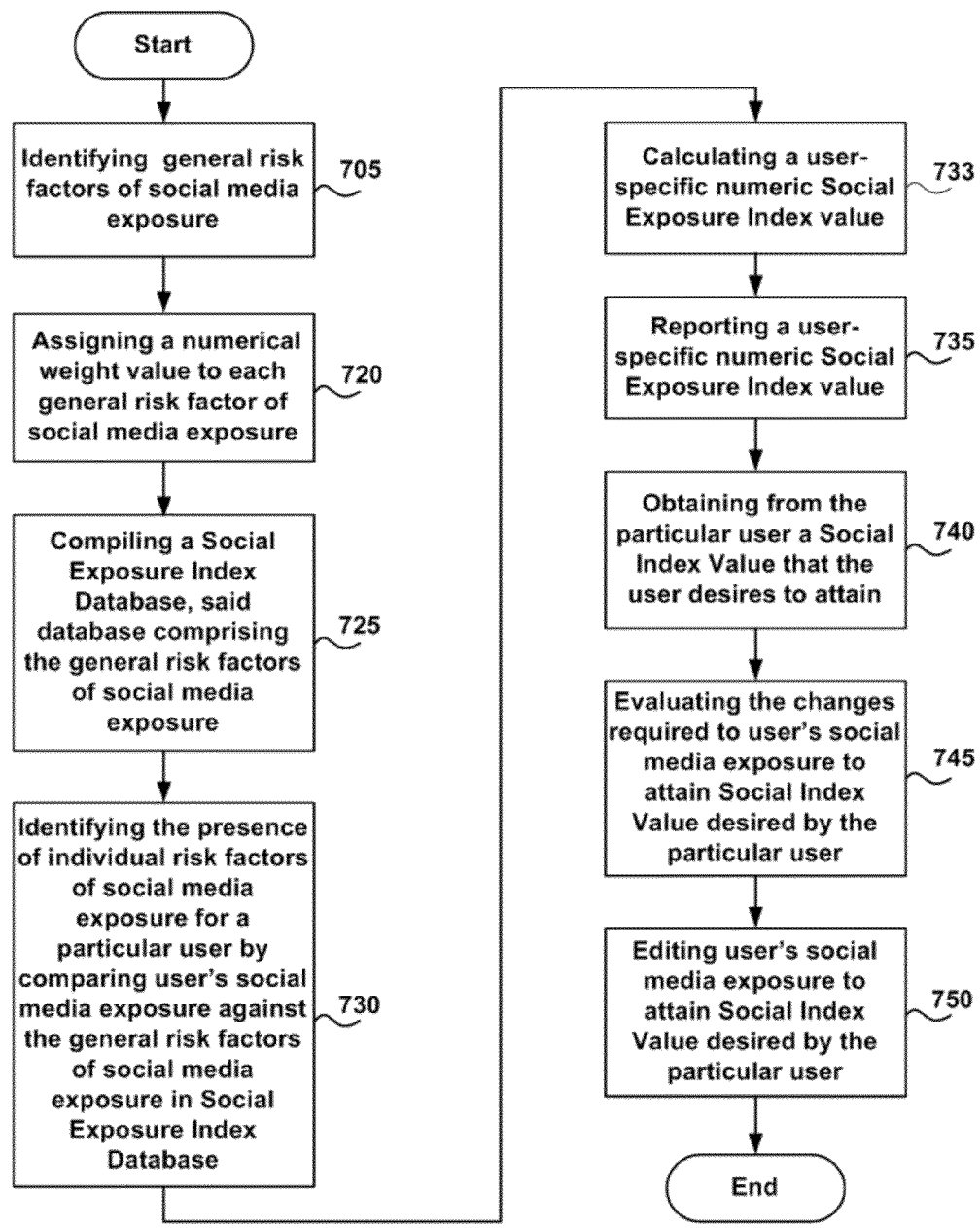
FIG. 9 illustrates the method of social exposure evaluation and management with the use of the Social Exposure Index.

FIG. 8 illustrates a personalized graphic privacy statement 600 comprising a shape of a door hanger label 605. That is, the personalized graphic privacy statement 600 appears to the user and to the observers who will see this graphic privacy statement 600 posted across user's social media environments, in the shape of a door hanger label 605. This is the shape generally similar to that of the cardboard "DO NOT DISTURB" signs distributed in hotel rooms across the world. Of course, in other embodiments, the shape of the personalized graphic privacy statement 600 may be different, such as a shape of a stop or a warning sign, or any other shape. In the example of FIG. 8, the graphic privacy statement 600 comprises a bright background 601, such as bright yellow, to emphasize the urgency of the message (although other colors can be used in other variations).

In the preferred embodiments, the personalized graphic privacy statement comprises a user-editable literal element 610. In the example, illustrated on FIG. 8, the literal element is illustrated by one or more of the user-customizable text fields 615, where the user may enter such information as the reasons for unavailability 620, expected time of availability 625, and/or other personalized messages.

In the embodiment of FIG. 8, at least some of the customizable text fields 615 are pre-filled with the words "DO NOT DISTURB", while other customizable text fields 615 may be presented blank to the user, to allow the user to enter a customized message. The "DO NOT DISTURB" text is also preferably editable.

The preferred DND APP embodiments also comprise a custom image field 630. The custom image field 630 allows the user to upload a customized personal photograph or other image from his mobile device or computer, to emphasize the reason for the absence, the urgency of the situation, or to otherwise attract attention to the graphic privacy statement 600. Thus the user may post the "DO NOT DISTURB" request, along with an explanation ("STUDYING", for example), the time frame "UNTIL THE FINALS ARE OVER" and an illustration emphasizing the need for privacy, such as a picture of the user sleeping on the pile of textbooks. This embodiment allows the user to expressively and efficiently request privacy or explain the reason for unavailability across several social media platforms, without spending valuable time and efforts to log in and inform the contacts in each individual social media environment. Similarly, this functionality may be reversed by the user to inform others of the return or availability, by posting "I AM BACK" or "DO DISTURB" door hangers across his social media accounts.

This graphic privacy statement 600 functionality may be utilized by itself in one embodiment of the SYSTEM 10 or in conjunction with other privacy preferences 120, allowable by SYSTEM 10. In embodiments, where SYSTEM 10 allows the user 12 to set exposure characteristics in accordance with color coding or other levels of exposure, posting of the graphic privacy statement 600 may be set by user as part of one of the wider privacy level selections (For example, as part of the yellow privacy level).

Furthermore, the SYSTEM 10 of some embodiments of the present invention, may be configured to alter the overall appearance of the of the user's profile by replacing or adding pictures and posts. For example, the user 12 may be interviewed for a professorial position at the Mathematics department of a University. Upon exiting from the interview room, the user 12 may flick the switch, and all the latest postings on the user's 12 social media sites will be deleted, substituted with, or enhanced by mathematical proofs and ponderings. The profile picture of a partying young man, surrounded by friends and alcohol, may be replaced with that of a teacher in a knitted vest, writing complex formulas on the blackboard. Alternatively, if the user is being interviewed for the position of a clown, all mathematical ponderings will be instantly removed and replaced with jokes and goofy photos. If properly preset, the changes may be executed by the SYSTEM 10 within seconds, before the interviewer can ever access the user's profile. Such an embodiment allows the user to instantly emphasize or limit his social presence to a certain aspect of his online personality. In real life, we do not come to most job interviews in clown costumes and do not come to a beach in a suit. This embodiment of the invention allows for similar control of our online appearance, depending on life's circumstances.

Once the SYSTEM 10 has implemented the preferences, it will preferably present the user with the account of implemented changes 200 (otherwise known as Confirmation of Action 200). Upon implementation, the SYSTEM 10 may, present a report page, or send an e-mail or a text message to the user. Such a report will account for changes implemented, and assure that the user 12 is aware of the steps implemented to protect his/her privacy and reputation.

It is to be understood that while the system and method of the present invention have been described and illustrated in detail, the above-described embodiments are simply illustrative of the principles of the invention and the forms that the invention can take, and not a definition of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the claims below.

I claim:

1. A computer-implemented social exposure management system for expeditious and near-simultaneous alteration of user's privacy characteristics across a plurality of external social media environments, the computer-implemented system comprising:
a hardware processor;
at least one GUI interface,
said GUI interface adapted to interact with the a user to set up user's preferences,
wherein the user sets up user preferences for one or more of the plurality of the external social media environments;
wherein each of the plurality of the external social media environments is located outside the social exposure management system and is connectable with the social exposure management system through API;
the system further comprising at least one internet connection adapted for communication between the system and the plurality of social media environments;
a plurality of databases, said plurality of databases comprising:
a database of external social media environments of the plurality of the external social media environments, available for privacy alteration via the system; a database of available API-modifiable options for each external social media environment of the database of external social media environments;
wherein the available options are the options provided by each external social media environment for alteration through API;
a database of user-specific privacy settings,
wherein said database of user-specific privacy settings is configured to save user-selected preferences,
and wherein said database of user-specific privacy settings, comprises saved user-selected preferences;
a processing component adapted for transforming the saved user-selected preferences and commands into an action command sequence;
wherein said action command sequence is executable on at least one external social media environment from the database of external social media environments upon an activation of an execution component by the user;
and wherein the saved user-selected preferences are dormantly stored within the database of user-specific privacy settings, pending the activation of the execution component;
wherein the execution component, is adapted for implementation of the saved user-selectable preferences and commands by transmitting the action command sequence to at least one external social media environment from the database of external social media environments;
further comprising a feedback system adapted for providing a report of attempted execution of the action command sequence, said action command sequence based on the saved user-selected preferences, in altering of user's privacy characteristics.

2. The system of claim 1, wherein the preferences comprise an option to create a personalized graphic privacy statement.

3. The system of claim 1, wherein
the transmission of the action command sequence to at least one external social media environment from the database of external social media environments refers to the transmission of the action command sequence to a plurality of external social media environments from the database of external social media environments.

4. The system of claim 1, wherein the personalized graphic privacy statement comprises a user-editable literal element.

5. The system of claim 4, wherein the personalized graphic privacy statement comprises a custom image field,
and wherein the personalized graphic privacy statement comprises a shape of a door hanger label.

6. The system of claim 5, wherein the user-editable literal element comprises a phrase "DO NOT DISTURB".

7. The system of claim 1, Further comprising
a plurality of servers; and
wherein the action command sequence comprises API commands.

8. The system of claim 7, further comprising:
a database of user-specific privacy settings,
and wherein
the user's preferences are saved into the database of user-specific privacy settings, pending implementation by the user.

9. The system of claim 7, further comprising:
distinct levels of privacy, said privacy levels being selectable by the user.

10. The system of claim 9, wherein each of the distinct levels of privacy is associated with a color.

11. The system of claim 9, wherein the GUI interface comprises an adjustable slider for setting a level or privacy.

12. The system of claim 1, further comprising a Social Exposure Index Server.

13. A computer-implemented method of social exposure management for expeditious and near-simultaneous manipulation of user's privacy characteristics across a plurality of external social media environments, comprising the steps of:
providing user with a GUI interface,
said GUI interface comprising:
a selection of a plurality of external social media environments;
said GUI interface adapted to interact with a user to set up user's preferences;
allowing the user to set up user preferences for one or more of the plurality of the external social media environments;
wherein each of the plurality of the external social media environments is located outside the social exposure management system and is connectable with the social exposure management system through API;

said GUI interface, further comprising:

a selection of at least one user-modifiable privacy preference for each of the plurality of external social media environments;

further providing:

at least one internet connection adapted for communication between the system and the plurality of social media environments;

a plurality of databases, said plurality of databases comprising:

a database of external social media environments of the plurality of the external social media environments, available for privacy alteration via the system;

a database of available API-modifiable options for each external social media environment of the database of external social media environments;

wherein the available options are the options provided by each external social media environment for alteration through API;

a database of user-specific privacy settings, wherein said database of user-specific privacy settings is configured to save user-selected preferences and wherein said database of user-specific privacy settings, comprises saved user-selected preferences;

a processing component adapted for transforming the saved user-selected preferences and commands into an action command sequence;

wherein said action command sequence is executable on at least one external social media environment from the database of external social media environments upon an activation of an execution component by the user;

and wherein the saved user-selected preferences are dormantly stored within the database of user-specific privacy settings, pending the activation of the execution component;

the method further comprising the steps of:

interacting with the user through the GUI interface to set up user's privacy preferences;

transforming user's privacy preferences, entered through the GUI interface, into an action command sequence;

wherein said action command sequence is executable upon at least one external social media environment from the database of external social media environments upon an activation of an execution component by the user;

and wherein the saved user-selected preferences are dormantly stored within the database of user-specific privacy settings, pending the activation of the execution component;

he method further comprising the steps of:

implementation of the user's privacy preferences by transmitting the action command sequence to at least one external social media environment selected by the user from the selection of plurality of external social media environments, said action command sequence based on the saved user-selected preferences;

providing a confirmation of action to the user.

14. The method of claim 13, further comprising the steps of presenting the user with a list of options implementable by the system through API for each particular service;

waiting for user's activation of privacy preferences prior to implementation of the user's privacy preferences;

wherein the transmission of the action command sequence to at least one social media environment refers to the transmission of the action command sequence to the plurality of social media environments.

15. The method of claim 13, wherein user's activation of privacy preferences is accomplished by a virtual on-off control switch.

16. The method of claim 13, further comprising the step of displaying a Social Exposure Index value on the GUI interface, wherein the SEI value is represented by a number.

* * * * *